May 27, 1958    R. T. ANDERSON    2,836,427
AUXILIARY WHEEL ATTACHMENT FOR TRICYCLE
Filed Dec. 17, 1956
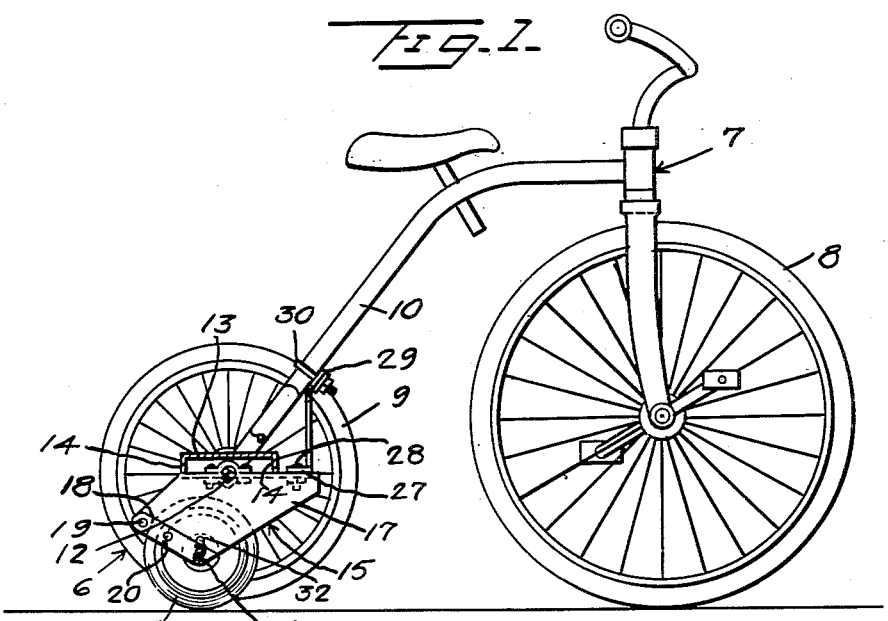
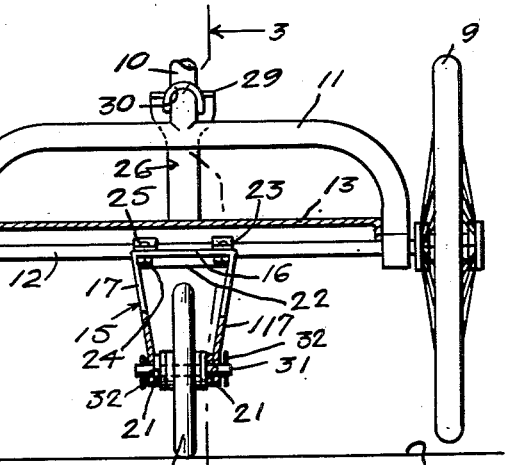
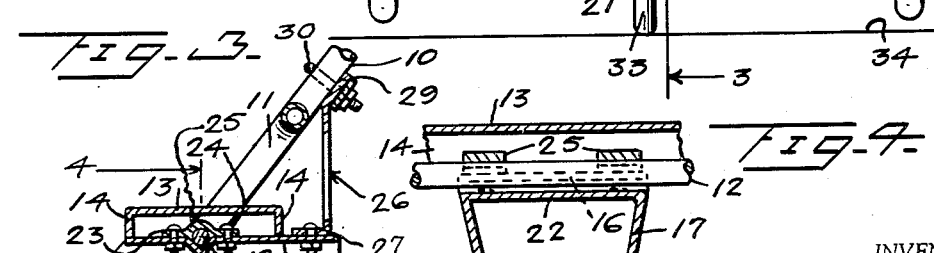
INVENTOR
R.T. Anderson
BY John N. Randolph
ATTORNEY

United States Patent Office 2,836,427
Patented May 27, 1958

2,836,427

AUXILIARY WHEEL ATTACHMENT FOR TRICYCLE

Robert T. Anderson, Valley Springs, Calif.

Application December 17, 1956, Serial No. 628,720

2 Claims. (Cl. 280—7.1)

This invention relates to an attachment for use with a conventional tricycle and more particularly to an attachment including a fourth wheel which is mounted at the rear end of the tricycle, substantialy in alignment with the front wheel thereof for cooperation with the front wheel for supporting the tricycle when in motion.

More particularly, it is an object of the present invention to provide an attachment of extremely simple construction which may be quickly applied to a conventional tricycle to enable the tricycle to be ridden as a bicycle and thereby materially increase normal usable life of a tricycle for a child.

A further object of the invention is to provide a fourth wheel attachment which may be adjusted to fit tricycles of different sizes, so that the attachment may be used on numerous makes and sizes of conventional tricycles.

Various other objects and advantages of the invention will hereinafter become more fully apparent from the following description of the drawing, illustrating a presently preferred embodiment thereof, and wherein:

Figure 1 is a side elevational view, partly in section, of a tricycle showing the attachment in an applied position;

Figure 2 is an enlarged rear elevational view, partly in section;

Figure 3 is a vertical sectional view, taken substantially along a plane as indicated by the line 3—3 of Figure 2, and Figure 4 is an enlarged fragmentary vertical sectional view, taken substantially along a plane as indicated by the line 4—4 of Figure 3.

For the purpose of illustrating the application and use of the tricycle attachment, designated generally 6 and comprising the invention, a conventional tricycle 7 has been illustrated having the usual front wheel 8 and the corresponding laterally spaced rear wheels 9. The downwardly and rearwardly inclined bar 10 of the tricycle frame terminates in the usual yoke-shaped portion 11 through the ends of which extends the rear axle 12. The rear wheels 9 are journaled on the ends of the axle 12 outwardly with respect to the ends of the yoke-shaped portion 11. A tread plate is disposed within said yoke-shaped portion 11 above the axle 12 and is rigidly secured to the ends of the yoke-shaped portion 11 and/or the axle 12, at the ends of the tread plate 13 so that the top portion of the tread plate is disposed above and spaced from the axle 12, while the downturned front and back edges 14 of the tread plate are laterally spaced from the axle 12, as best seen in Figures 1 and 3. The parts 8 to 14 of the tricycle 7 are all of conventional construction and have been illustrated and briefly described in order to afford a better understanding of the mounting of the fourth wheel attachment 6.

The attachment 6 includes a frame 15 of rigid construction, which is preferably formed of sheet metal and includes an elongated top wall 16 and corresponding depending side walls 17. The side walls 17 form integral depending extensions of the longitudinal side edges of the top wall 16 and are disposed preferably in downwardly converging relation to one another, as seen in Figures 2 and 4. The side walls 17 have downwardly and forwardly inclined substantially parallel bottom portions 18 which are provided with a plurality, preferably three sets of aligned openings 19, 20 and 21, which openings of each bottom portion 18 are disposed in longitudinally spaced relation to one another and at different distances below the plane of the top wall 16, as seen in Figures 1 and 3. The forwardmost openings 21 constitute the lowermost openings and are disposed nearest the vertical plane of the rear axle 12. The openings 20 are disposed behind and above the openings 21, the openings 19 are disposed above and behind the openings 20.

The top wall 16 has a transversely extending depression located nearer a rear end than a forward end thereof which forms an upwardly opening groove 22 of substantially V-shaped cross section which engages against the underside of the intermediate portion of the rear axle 12. A pair of clamp bars 23 extend across the rear axle 12 and have their ends secured by nut and bolt fastenings 24 to the top wall 16, forwardly of and behind the axle 12, and the bars 23 include intermediate portions 25 which are preferably of substantially inverted V-shape in cross section and overlie and bear on the rear axle 12, so that when the fastenings 24 are tightened the intermediate portion of the axle 12 will be tightly clamped between the portions 22 and 25. Portions of the top wall 16 bear against portions of the bottom edges of the depending walls or flanges 14, so that said flanges assist in retaining the frame 15 rigidly with respect to the axle 12.

However, it is not essential that the top wall bear against the flanges 14, since the attachment 6 may be utilized with tricycles not provided with such a tread plate as is shown at 13, and a brace 26 is provided to rigidly retain the frame immovable with respect to the axle 12. The brace 26 has a rearwardly turned lower end 27 which is detachably secured by a fastening 28 against the upper side of the forward end of the top wall 16, forwardly of the front tread plate flange 14. The brace 26 extends upwardly from the top wall 16 and has a forwardly inclined upper end 29 which is disposed against a portion of the underside of the bar 10 and which is detachably clamped immovably thereto by a U-bolt and nut fastening 30, the bolt of which embraces said bar 10 and has its ends extending downwardly and forwardly through the brace end 29.

An axle 31 is shown extending through the forward and lowermost openings 21 and is retained therein detachably by cotter pins or the like 32. A wheel 33 is journaled on the intermediate portion of the axle 31 and is disposed between the frame walls 17.

The axle 31 is disposed in the lowermost forward openings 21 due to the fact that the attachment 6 is shown mounted on a large tricycle 7, so that the wheel 33 will be nearly beneath the rear axle 12 and in its lowermost position. Thus, the wheel 33 and frame 15 will most readily support the weight of the rear portion of the tricycle and the rider, due to its location with respect to the axle 12. Additionally, as larger tricycles are usually provided with larger rear wheels, the axle 31 is in engagement with the frame openings 21 so that wheel 33 will be in a lowermost position with its bottommost portion below the bottommost portions of the wheels 9. Thus, when the axle 12 is disposed horizontally as seen in Figures 1 and 2, the rear wheels 9 will be disposed slightly above and out of contact with the horizontal surface 34 engaged by the fourth or auxiliary wheel 33 and the front wheel 8. The spacing of the rear wheels 9 above the surface 34 is ordinarily relatively slight so that the tricycle 7 will not be tilted laterally to any appreciable extent to position one of the wheels 9 in contact with the surface 34.

When the attachment 6 is utilized with tricycles of smaller size which are ordinarily equipped with smaller rear wheels than the wheels 9 and which normally are lighter and carry a lesser load than the tricycle 7, the axle 31 is positioned in the openings 20 for slightly elevating the auxiliary wheel 33 relative to the rear axle of the tricycle. For very small tricycles the axle 31 is mounted in the rearmost openings 19. It will be understood that in these alternate positions, the axle 31 and wheel 33 will be disposed to extend below the level of the bottommost portions of the rear wheels of the tricycle, on which the attachment is mounted, to function in the same manner as illustrated in the drawing. However, with the smaller tricycles carrying a lighter load, it is not necessary that the wheel 33 and its axle 31 be disposed nearly beneath the rear axle of the tricycle.

With the attachment 6 applied to the tricycle 7 and with the wheel 33 thereof mounted in its adjusted position as illustrated, a child can ride safely on the tricycle supported by the wheels 8 and 33 and one of the wheels 9 with the tricycle slightly tilted to one side. When sufficient speed is attained and if the child has a proper balance, the ground engaging rear wheel 9 will be elevated and the child will then ride the tricycle balanced on the front wheel 8 and the auxiliary rear wheel 33. The conventional tricycle rear wheels 9 will then function as outrigger rear wheels to prevent the tricycle overturning laterally should the child lose its balance as when slowing down or stopping. It will thus be apparent that the attachment 6 provides a device of extremely simple construction which may be very economically manufactured and sold and which can be quickly and easily applied to a conventional tricycle to enable it to be ridden as a bicycle and thus considerably increase the usable life of a tricycle for a child. In addition, the attachment 6 will provide a safe means to enable a child to learn to ride properly on a two-wheeled vehicle without risk of injury due to loss of balance, so that the child may thereafter at the proper time commence to ride a conventional bicycle without the necessity of learning the technique involved.

Various modifications and changes are contemplated and may obviously be resorted to, without departing from the function or scope of the invention as hereinafter defined by the appended claims.

I claim as my invention:

1. The combination with a conventional tricycle including a front wheel, laterally spaced rear wheels, a rear axle on which said rear wheels are journaled, and a rear frame portion secured to said rear axle; of an auxiliary wheel attachment for the tricycle comprising a frame of rigid construction including an elongated top wall and corresponding side walls extending downwardly from said top wall and disposed longitudinally thereof, a portion of said top wall being disposed beneath and bearing against the intermediate portion of the rear axle, clamping means detachably securing said top wall rigidly to the rear axle with the axle disposed crosswise of the top wall and said frame disposed in alignment with the front wheel, an auxiliary axle having end portions extending through and mounted in said side walls, and an auxiliary wheel journaled on said auxiliary axle between said side walls and supported thereby below the level of said top wall and the rear axle and in alignment with the front wheel, said auxiliary wheel being supported by the auxiliary axle and frame with the lowermost portion thereof disposed below the level of the lowermost portions of the tricycle rear wheels, said side walls being provided with a plurality of corresponding openings spaced different distances below the level of said top wall and in aligned openings of which said axle is selectively mounted for positioning the auxilary axle and auxiliary wheel at different levels beneath said top wall and rear axle for accommodating the tricycle attachment to tricycles of different sizes having rear wheels of different diameters, said side wall openings being longitudinally spaced relative to the frame and at an incline downwardly and forwardly such that the lowermost side wall openings are disposed in forwardmost positions and most nearly in the vertical plane of the rear axle.

2. The combination with a conventional tricycle including a front wheel, laterally spaced rear wheels, a rear axle on which said rear wheels are journaled, and a rear frame portion secured to said rear axle; of an auxiliary wheel attachment for the tricycle comprising a frame of rigid construction including an elongated top wall and corresponding side walls extending downwardly from said top wall and disposed longitudinally thereof, a portion of said top wall being disposed beneath and bearing against the intermediate portion of the rear axle, clamping means detachably securing said top wall rigidly to the rear axle with the axle disposed crosswise of the top wall and said frame disposed in alignment with the front wheel, an auxiliary axle having end portions extending through and mounted in said side walls, and an auxiliary wheel journaled on said auxiliary axle between said side walls and supported thereby below the level of said top wall and the rear axle and in alignment with the front wheel, said auxiliary wheel being supported by the auxiliary axle and frame with the lowermost portion thereof disposed below the level of the lowermost portions of the tricycle rear wheels, portions of said top wall, disposed in advance of and behind the rear axle and said clamping means, being adapted to bear against lower edges of depending front and rear flanges, respectively, of a tread plate mounted in said rear frame portion on the rear axle, to prevent turning of the frame relative to the rear axle.

References Cited in the file of this patent
UNITED STATES PATENTS

| | | |
|---|---|---|
| 686,107 | Moore et al. | Nov. 5, 1901 |
| 1,076,555 | Dillon | Oct. 21, 1913 |
| 1,304,331 | Leicht | May 20, 1919 |
| 1,340,024 | Davis et al. | May 11, 1920 |
| 2,011,402 | Gallo | Aug. 13, 1935 |
| 2,250,744 | Blu | July 29, 1941 |
| 2,512,524 | Gallo | June 20, 1950 |
| 2,535,283 | Groom | Dec. 26, 1950 |